O. F. SCHOLZ.
WIRE CLAMP OR SUPPORT.
APPLICATION FILED FEB. 17, 1909.
929,026.  Patented July 27, 1909.
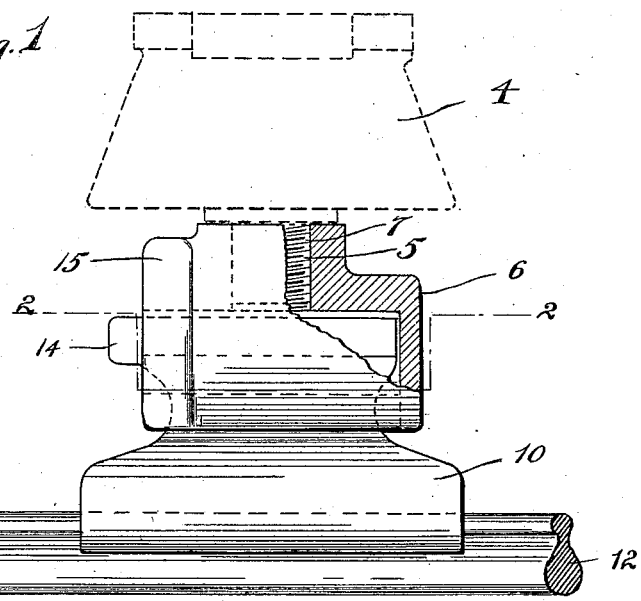
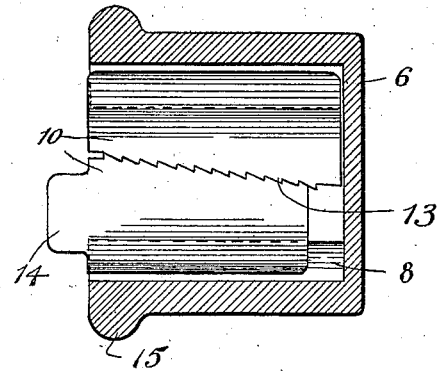
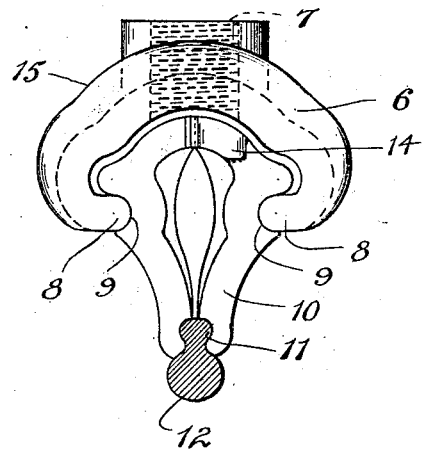
Witnesses:
Inventor,
Oscar F. Scholz
By Glenn S. Noble
Att'y.

UNITED STATES PATENT OFFICE.

OSCAR F. SCHOLZ, OF CHARLESTON, WEST VIRGINIA.

WIRE CLAMP OR SUPPORT.

No. 929,026.

Specification of Letters Patent.

Patented July 27, 1909.

Application filed February 17, 1909. Serial No. 478,524.

*To all whom it may concern:*

Be it known that I, OSCAR F. SCHOLZ, a subject of the Emperor of Germany, residing at Charleston, in the county of Kanawha and State of West Virginia, have invented certain new and useful Improvements in Wire Clamps or Supports, of which the following is a specification.

This invention relates more particularly to devices adapted to engage with and support wires, such as electric trolley wires, or the like. Its objects are to provide a suitable and efficient clamp by means of which connection may be made between a trolley wire, or other wire, and a rigid or fixed insulating support, or the like; to provide such a device which shall consist of few and inexpensive parts requiring little or no machine work; and such other objects as will appear hereinafter in connection with the following description.

I have illustrated my invention in the accompanying drawings, in which—

Figure 1 is a side elevation of a clamp or hanger embodying my invention, a portion being broken away to show the interior construction; Fig. 2 is a sectional view on line 2—2 of Fig. 1; and Fig. 3 is an end view of the clamp or hanger shown in connection with a figure 8 wire.

As shown in Fig. 1, 4 represents any ordinary or preferred form of insulating support, such supports being adapted to be secured in the roof of a mine or other place where it is desired to string electric trolley wires or other wires. These supports are usually provided with threaded stems 5, between which stems and the wires some sort of connection or clamping device is necessary for supporting the wires, these clamping devices being the subject of the present invention. For this purpose, I provide a cap or casing 6 having a threaded hole 7 therein for engagement with the stem 5. The lower part of the cap or casing 6 is provided with inwardly projecting guides or flanges 8 which are adapted to engage with grooves 9 in the outer sides of the clamping members 10—10. The lower ends of these members are provided with grooves 11 for engagement with the wire 12 to be supported. As shown in the drawings, this wire is indicated as a figure 8 wire, but, of course, the grooves 11 may be arranged to engage with any desired form of wire. Clamping members 10—10 are made wedge-shaped at the top, as indicated in Fig. 2, and, for the purpose of holding the two parts securely in position, they are preferably provided, along the engaging edges, with teeth or notches 13, which will effectually prevent any slippage between such edges. One of the clamps 10 is also preferably provided with a projecting lug 14, whereby it may be driven into position. In order to strengthen the outer edge of the cap or casing 6, I prefer to provide a reinforcing rib 15, which will tend to prevent the casing from being split or cracked when the parts are driven together.

The operation of the clamp will be readily understood by one skilled in the art. The cap or casing 6 is first screwed into position on the stem 5, when it is ready to receive the clamping members. The clamping members are then preferably arranged in position in the cap, but with one of the parts sufficiently withdrawn as to allow the lower edges to be separated to engage with the wire. Then, with the wire in position in the groove 11, the outwardly projecting member is driven into position, when the wedging action at the top of the clamps will cause the lower edges to engage closely with the wire, thereby holding it securely in position.

It will, of course, be obvious that various changes may be made in the shape or arrangement of the parts comprising my improved wire clamp, without departing from the spirit of this invention.

What I claim and desire to secure by Letters Patent is:

1. In a device of the character set forth, the combination of a cap or casing having inwardly projecting flanges, wire supporting members adapted to engage with said flanges, said members having downwardly projecting arms adapted to engage with the wire, and upward projections arranged with longitudinal wedge-shaped engaging faces, whereby, when the wire supporting members are driven into position in the casing, the lower edges will be forced into engagement with the wire.

2. In a wire clamp or support, the combination of a cap or casing having a threaded opening therein for engagement with an insulator stem, longitudinal guides in said cap, a wire supporting clamp engaging with one of said guides and having its upper edge beveled longitudinally, and a second clamp engaging with the opposite guide in said casing and having its upper edge beveled oppositely to said first-named clamp, the lower edges of said clamps being adapted to engage with a trolley wire, the arrangement being such that, when the second clamp is driven into position, it will cause the lower edges of said clamps to engage closely with the wire.

3. In a wire clamp or support, the combination of a cap having parallel supporting flanges therein, wire clamps engaging with said flanges, the lower edges of said clamps being adapted to grasp the wire to be supported and the upper edges of said clamps being provided with beveled and serrated engaging edges, for the purposes described.

OSCAR F. SCHOLZ.

Witnesses:
FRED L. RECKTENWALD,
MAUDE MORRIS.